United States Patent [19]
Smart et al.

[11] Patent Number: 5,653,884
[45] Date of Patent: Aug. 5, 1997

[54] SEPARATING SOLUTES FROM SOLUTIONS

[75] Inventors: Neil Graham Smart, Preston; Mark D. Burford, Leeds; Anthony A. Clifford, Leeds; Keith D. Bartle, Leeds; Catherine M. Cowey, Leeds, all of United Kingdom

[73] Assignee: British Nuclear Fuels PLC, Cheshire, United Kingdom

[21] Appl. No.: 492,601

[22] Filed: Jun. 20, 1995

[30]  Foreign Application Priority Data

Jul. 9, 1994 [GB] United Kingdom ............... 9413875

[51] Int. Cl.$^6$ .................................................. B01D 11/00
[52] U.S. Cl. ................... 210/634; 210/639; 210/175; 210/181; 210/252; 210/198.1
[58] Field of Search .............................. 210/634, 639, 210/181, 175, 198.2, 643, 657, 511, 180, 198.1; 426/427, 252

[56]  References Cited

U.S. PATENT DOCUMENTS

| | | | |
|---|---|---|---|
| 4,349,415 | 9/1982 | DeFilippi et al. | 210/634 |
| 4,714,617 | 12/1987 | Gahrs et al. | 426/427 |
| 4,770,780 | 9/1988 | Moses | 210/634 |
| 4,877,530 | 10/1989 | Moses | 210/634 |
| 4,962,275 | 10/1990 | Bruno | 210/634 |
| 5,138,075 | 8/1992 | Ohgaki et al. | 210/634 |
| 5,160,044 | 11/1992 | Tan | 210/634 |
| 5,271,903 | 12/1993 | Durst et al. | 210/511 |

FOREIGN PATENT DOCUMENTS

WO92/05851  4/1992  WIPO .

*Primary Examiner*—Ana Fortuna
*Attorney, Agent, or Firm*—Nixon & Vanderhye P.C.

[57]  ABSTRACT

A method of separating a solute from a supercritical fluid which includes reducing the pressure of the supercritical fluid and is characterized in that the supercritical fluid and solute are mixed with another fluid, eg an inorganic or organic solvent under pressure, to cause a partial reduction in the pressure of the supercritical fluid followed by reduction of the pressure of the fluid mixture comprising the supercritical fluid and said other fluid. The fluid mixture pressure reduction may occur in a collection device. Such a device may have a collection solvent already present therein. The said other fluid used partially to depressurise the supercritical fluid may act as a collection solvent in a collection device. The collection device may include one or more collection vessels or alternatively a solid phase trap or a packed column for the purpose of trapping and collecting the solute.

14 Claims, 4 Drawing Sheets

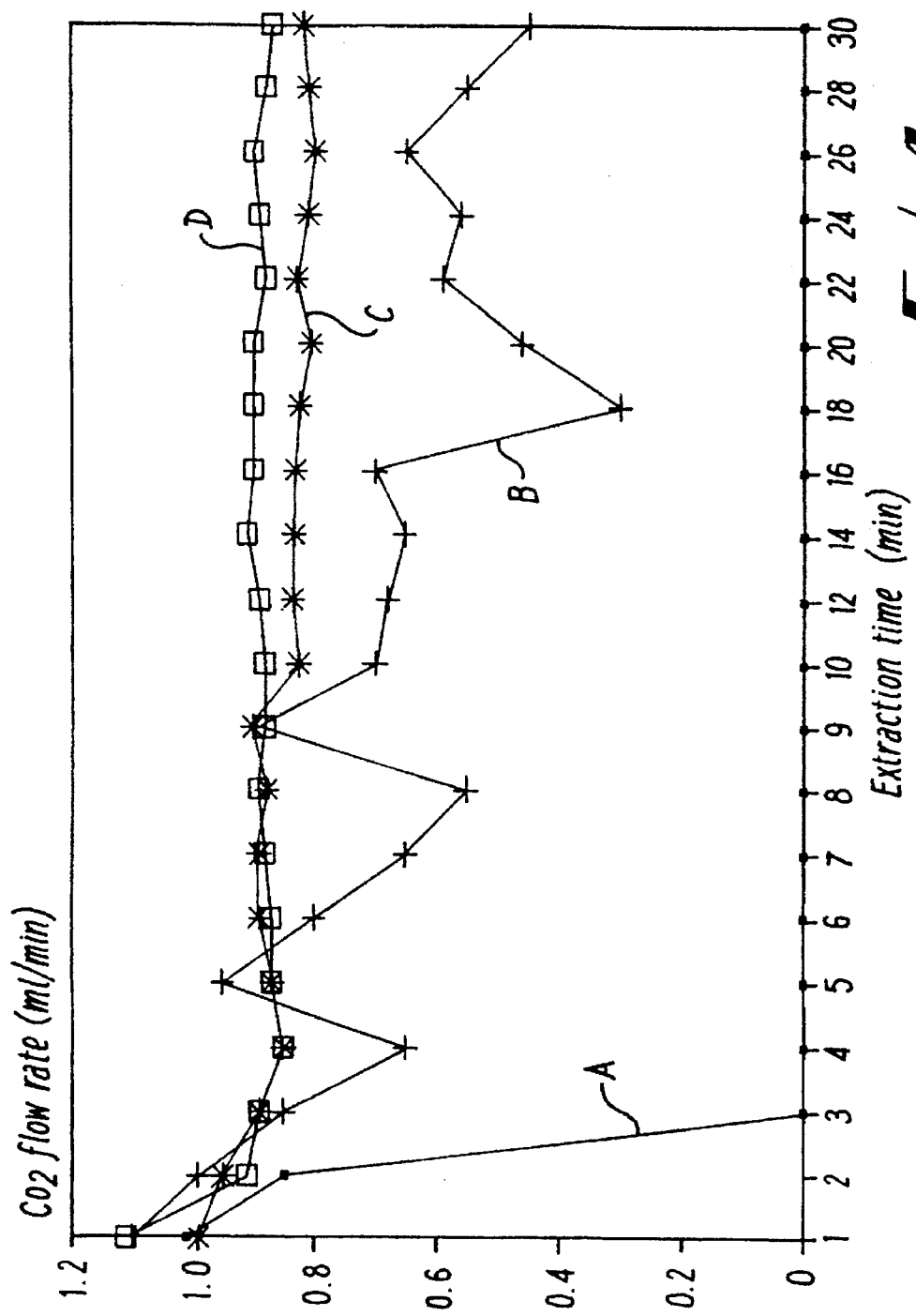

SEPARATING SOLUTES FROM SOLUTIONS

FIELD OF THE INVENTION

The present invention relates to the separation of solutes from solutions. In particular, it relates to the separation of solutes from solutions which comprise a supercritical fluid which has been used in a chemical process, especially a supercritical fluid extraction used for analytical or preparative purposes.

BACKGROUND OF THE INVENTION

Supercritical fluids such as carbon dioxide are becoming a popular alternative to organic solvents for extracting chemical species of interest from a host medium. For example, the extraction may be employed in the chemical analysis of liquid or solid samples or in a separation process in the chemical processing industry. A supercritical fluid is contacted with the host medium and the species of interest are solubilised by and extracted into the fluid. After the extraction has taken place, the extracted species are removed from the supercritical fluid by depressurising the fluid to a gas to enable the extracted species to be precipitated in a collection device which may for example contain an organic collection solvent to facilitate collection. In order to maintain the extraction pressure in the system and simultaneously to depressurise the supercritical fluid in a controlled manner, a flow restrictor acting as a back pressure regulator is required. However, since the depressurisation occurs inside the flow restrictor or at the flow restrictor output tip, the reduction of the fluid density, combined with the Joule Thomson cooling effect which occurs at the restrictor tip, can cause a decrease in the solubility of the extracted species which leads to precipitation and ultimately plugging of the restrictor.

Restrictor plugging is a very common occurrence during a supercritical fluid extraction particularly when the fluid is saturated with extracted species. One approach to preventing restrictor plugging is to use a mechanical and/or electrical feedback regulator with a variable orifice such as that used by various manufacturers, for example, Hewlett-Packard (European Patent EP 384969A2), Suprex (Technical note PD—12,9/92) and JASCO Corporation (M. Saito, T. Hondo and Y. Yamauchi in "Supercritical Fluid Chromatography", RSC Chromatography Monographs, London, 1989, page 203).

European Patent Application No. EP 384969A2 discloses a variable orifice which allows flow rates to be set independently of density and temperature. The size of the orifice at the restrictor nozzle varies depending on the pressure required. The extracted solutes are deposited in a sorbent/collection trap which after the extraction is flushed with organic solvent to elute the solutes into a collection vial.

The Suprex Corporation discloses in the reference noted above a variable automated restrictor which has an electronic sensor that registers restrictor plug formation and automatically opens and closes the restrictor to provide a uniform flow. The extracted species are collected in a collection module which consists of a collection trap that retains the species during the extraction, and a solvent pump that pumps solvent through the trap (after the extraction) to transfer the solutes into a collection vial.

The JASCO Corporation disclose in the reference noted above a variable flow restrictor which has a pressure sensor with a feedback mechanism which controls the opening and closing of the exit orifice depending on whether the extraction pressure is above or below the required value. The solutes released from the back pressure regulator are collected at atmospheric conditions inside a collection device.

An alternative approach to the mechanical and/or electrical feedback regulator is a linear flow restrictor constructed from tubing with a fixed internal diameter. To avoid restrictor plugging the linear restrictor is heated, as heating the restrictor counteracts the Joule-Thomson cooling effect at the restrictor tip and increases the supercritical fluid solubility of species having some volatility. Several manufacturers use a heated linear flow restrictor, namely: Suprex, U.S. Pat. No. 5,205,987, Dionex, International Patent Application No. WO92/06058, and ISCO, U.S. Pat. No. 5,268,103.

U.S. Pat. No. 5,203,987 discloses a restrictor which is constructed as a precisely machined stainless steel orifice which converts the solutes from a high pressure to a low pressure environment. The low pressure side is in fluidic communication with the collection means.

International Patent Application No. WO92/06058 discloses a temperature controlled fused silica restrictor secured inside a stainless steel tube by means of an epoxy resin. Most of the restrictor is directly heated and the extracted species are collected in an organic solvent.

U.S. Pat. No. 5,268,103 discloses a temperature controlled stainless steel restrictor that is completely heated. The end of the restrictor is placed in an organic solvent so that the solutes can be collected directly into a liquid collection solvent.

All of these known systems are very expansive and several are not amenable to direct collection of extracted species in an organic solvent. Furthermore, they all rely on heat or the added complication of an orifice opening and closing device to avoid restrictor plugging.

The purpose of the present invention is to provide a new approach to the aforementioned problem of restrictor plugging.

SUMMARY OF THE INVENTION

According to the present invention there is provided a method of separating a solute from a supercritical fluid which includes reducing the pressure of the supercritical fluid and is characterised in that the supercritical fluid and solute are mixed with another fluid under pressure to cause a partial reduction in the pressure of the supercritical fluid followed by reduction of the pressure of the fluid mixture comprising the supercritical fluid and said other fluid.

The fluid mixture pressure reduction may occur in a collection device. Such a device may have a collection solvent already present therein. Alternatively, the said other fluid used partially to depressurise the supercritical fluid may act as a collection solvent in a collection device.

The collection device may include one or more collection vessels or alternatively a solid phase trap or a packed column for the purpose of trapping and collecting the solute.

The said supercritical fluid and the other said fluid are referred to herein as fluid 1 and fluid 2 respectively. If fluid is present in the collection device prior to commencing the extraction it is referred to as the collection solvent. The collection solvent may be the same as fluid 2. Fluid 1 and fluid 2 may comprise first and second fluid flows which are combined to form the said fluid mixture as a combined fluid flow. Any practical proportion by volume of fluid 1 and fluid 2 in the said mixture which may be accurately delivered by a pump can be used in this method.

As noted above, the mixture of fluid 1 and fluid 2 may be passed into a collection device in which a collection solvent may be contained. Solute contained in fluid 1 may be separated from fluid 1 by depressurising the fluid mixture to atmospheric conditions in the collection device, fluid 1 returning to a gas and venting to the atmosphere whilst the solute solvates in fluid 2 or the collection solvent. The solute may subsequently be separated in a known way, eg by evaporation, filtration, centrifugation, or flotation from fluid 2 or the collection solvent.

Fluid 1 may be one of the known supercritical fluids employed in the prior art, eg carbon dioxide, nitrous oxide, chlorodifluoromethane or water. The fluid may be heated to a suitable temperature in the range of 20° C. to 400° C. The fluid may be combined with other optional components for particular applications, eg organic or inorganic modifiers such as methanol, or carbon tetrachloride respectively, as well as complexants, derivatizing agents and/or conditioning agents, ie oxidising or reducing agents as mentioned below and as described in Applicants' copending International Patent Application No. PCT/GB95/00891.

Fluid 2 may comprise an organic solvent (eg methanol) or an inorganic solvent (eg carbon tetrachloride) or a mixture of organic and inorganic solvents. Fluid 2 may also be one of the known supercritical fluids employed in the prior art, eg carbon dioxide, nitrous oxide, chlorodifluoromethane, or water. Where the fluid is an organic solvent it may comprise one of the known organic collection solvents employed in the prior art, eg methanol, dichloromethane or water. The solvent comprising fluid 2 may be the same as the collection solvent. Fluid 2 may be heated to help maintain the fluid in a supercritical state if a supercritical fluid is used, or heated to help maintain the solubility of the solute in the organic or inorganic fluid.

The collection solvent may be one of the organic collection solvents employed in the prior art, eg methanol, dichloromethane, or water. The collection solvent may or may not be present in the collection device at the beginning of the operation of the method.

The solution comprising fluid 1 may be passed through a flow restrictor, eg a small diameter pipe, prior to mixture with fluid 2 wherein high pressure fluid 1 is converted to a lower pressure mixture of fluid 1 and fluid 2. This ensures that the flow rate of fluid 1 is positive before mixture with fluid 2. An optional check valve may also be incorporated into the flow line of fluid 1 further to ensure that fluid 1 is not contaminated with fluid 2 prior to the mixing of the two fluids at the predetermined location in the mixing system.

The mixture of fluid 1 and fluid 2 may be passed through a valve comprising a back pressure regulator by which the pressure of the mixed fluids may be reduced to permit reduction of solubility and release of the solute.

The flow restrictor and/or back pressure regulator may be heated with a thermostatically controlled heating device to counteract the Joule Thomson cooling effect of the depressurising supercritical fluid in the flow restrictor and/or pressure regulator.

By use of the method according to the present invention a substantially constant supercritical fluid flow rate may be achieved which eliminates the aforementioned plugging which occurs in the prior art when depressurising the supercritical fluid. This is as demonstrated for example in Example 6 in the embodiments described hereinafter. The use of a mobile solvent comprising fluid 2 facilitates the efficient collection of the solute in fluid 2 and/or the collection solvent contained in the collection device. The mobile solvent comprising fluid 2 also reduces the possibility of evaporation of the collection solvent, and also avoids unwanted aerosol formation in the collection solvent—both problems associated with the prior art.

The invention may also be used with a cooled (below room temperature) collection device in which the combined fluid 1 and fluid 2 can be collected in a cold collective device cooled externally with a cooling system (eg a refrigeration unit, or acetone/ice cold bath etc.) so that liquid solvent evaporation can be further reduced and the collection efficiency of the volatile analytes increased.

The mixture of fluid 1 and fluid 2 delivered to the collection device may advantageously be delivered by a tube which is heated, eg by a thermostatically controlled heating filament provided on the wall of a delivery tube.

By allowing solutes to be solubilised in the pressurised fluid 2, the supercritical fluid comprising fluid 1 may be depressurised directly into a collection solvent or in fluid 2 which allows very volatile solutes to be efficiently collected.

Furthermore, by using an appropriate fluid 2 flow rate, the addition of fluid 2 into the collection device can be set to match the collection solvent evaporation rate so that the collection solvent volume is maintained throughout the extraction. The maintenance of a substantially constant collection solvent volume in this way enhances the collection efficiency of the system and enables the apparatus in which the method is carried out to be operated unsupervised as manual addition of the collection solvent is no longer required during the extraction.

By varying the pressure of fluid 2, the flow rate of fluid 1 can be reproducibly and reversibly controlled. When the pressure of fluid 2 is increased the flow rate of fluid 1 is decreased and vice versa.

By using a pressurised fluid, viz fluid 2, to reduce partially the pressure of the supercritical fluid comprising fluid 1 a linear flow restrictor of large cross-sectional area may be employed to reduce the pressure of fluid 1 before mixture with fluid 2. In contrast to the prior art, this allows a large range of flow rates of fluid 1 to be achieved at various temperatures and pressures using a single restrictor. The apparatus in which the method is carried out does not therefore have to be depressurised and dismantled to allow restrictors to be changed when the experimental conditions are different. This therefore reduces operational time and cost. Furthermore, if the linear flow restrictor does become plugged it can be "back-flushed" in situ with fluid 2, without the need to dismantle the system. Thus depending on the pressure gradient, a fluid flow can be established in both forward and reverse directions inside the restrictor, so facilitating the cleaning of the system.

Also, as demonstrated for example in Example 5 as described below, the collection efficiency of solutes extracted using a supercritical fluid is enhanced where a variety of different solutes are to be collected.

The medium from which chemical species is desired to be removed by the supercritical fluid solvent in the method according to the present invention may be a solid or liquid medium. Where the medium is a solid it may comprise a particulate material such as soil, sludge, air particulates, foodstuffs, an industrial process residue, an industrial process slag or an industrial process product or the like. The species may be contained on the surface of the particles and/or bound within the particles. The medium could alternatively be a material to be decontaminated, eg a metal or concrete structure, or waste building materials such as rubble or contaminated waste materials such as rubber, plastics or textiles materials. Where the medium is a liquid it may for example comprise a process solvent or an industrial effluent stream.

The method of the present invention may for example be employed to analyse the concentration of chemical species of interest in liquid or solid samples. For example, when analysing for the presence of contaminants it may be desirable to produce a stock solution which is subsequently divided into multiple samples for different analyses.

Where the present invention is employed to decontaminate surfaces the surface may be contaminated with radioactive or non-radioactive toxic heavy metal species or other hazardous material.

The present invention may alternatively be employed in processes which employ conventional solvent extraction, eg extraction of caffeine from coffee, fats from foodstuffs, pesticides and polycyclic aromatic compounds from soil, petroleum products from source ore, purification of vitamins, fractionation of polymers, dissolution of actinides in the reprocessing of irradiated nuclear fuel or dissolution of uranium in the refinement treatment of uranium ore.

The present invention may alternatively be employed for soil clean-up for land remediation purposes. The species to be extracted by such use of the present invention or in radioactive heavy metal decontamination may comprise species which may include:

(i) actinides or their radioactive decay products or compounds thereof;

(ii) fission products;

(iii) heavy metals or compound thereof.

Actinides are elements having periodic numbers in the inclusive range 89 to 104. The species to be extracted by the present invention may alternatively comprise non-radioactive heavy metal species. Non-radioactive heavy metals desired to be separated by the method of the present invention include toxic metals such as cobalt, chromium, lead, cadmium and mercury which are commonly found as earth contaminants near industrial plants and on waste disposal sites and in aquatic sediments employing chemicals containing those elements.

Where the present invention is employed to extract radioactive or non-radioactive heavy metal species the fluid comprising supercritical fluid solvent, fluid 1, desirably includes a complexing agent and/or oxidising or reducing agent as aforesaid. The complexant employed in the method according to the present invention is selected according to the metal species to be extracted. Desirably, the complexant has high volatility and has a significant change in solubility in the supercritical fluid with temperature. This allows the complexes formed to be separated from the solvent by known processes such as precipitation.

In the method according to the present invention a conditioning agent such as an organic or inorganic modifier, oxidising or reducing agent, complexant, and/or derivatizing reagent may be added to the supercritical fluid used to form fluid 1 at any time prior to or during contacting of the medium containing the species to be extracted. For example the conditioning agent may be separately formed into an extractant mixture and then added to supercritical fluid in an extractant vessel and the extractant solvent so formed may be passed along a tube or pipe under pressure to a contractor in which the medium to be treated is contacted. Alternatively, the conditioning agent may be added directly to the medium to be treated prior to or during the supercritical fluid coming into contact with the medium.

However, when a conditioning agent such as an oxidising agent or a complexing agent is used to extract metals, a stainless steel system as conventionally used in supercritical fluid extraction is of limited application due to corrosion of the steel by these reagents. So, for metal extraction applications a more corrosion resistant, high temperature, high pressure system desirably is used, constructed for example of corrosion resistant materials such as titanium, tantalum and/or zircalloy. The advantage of using corrosion resistant metals is demonstrated for example in Example 8 in the specific embodiments described hereinafter.

The use of supercritical fluids in chemical processes, such as extraction, purification, fractionation, and reaction kinetic techniques embodying the present invention may beneficially be carried out by using chemicals which are not themselves harsh to the environment and without substantial production of secondary aqueous, organic and/or inorganic waste streams as in the prior art.

Embodiments of the present invention will now be described by way of example with reference to the accompanying drawings, in which:

BRIEF DESCRIPTION OF THE DRAWINGS

FIG. 4 is a graph of supercritical $CO_2$ flow rate versus extraction time in a method of use of the apparatus shown in FIG. 1.

DESCRIPTION OF SPECIFIC EMBODIMENTS OF THE INVENTION

Figure 1:
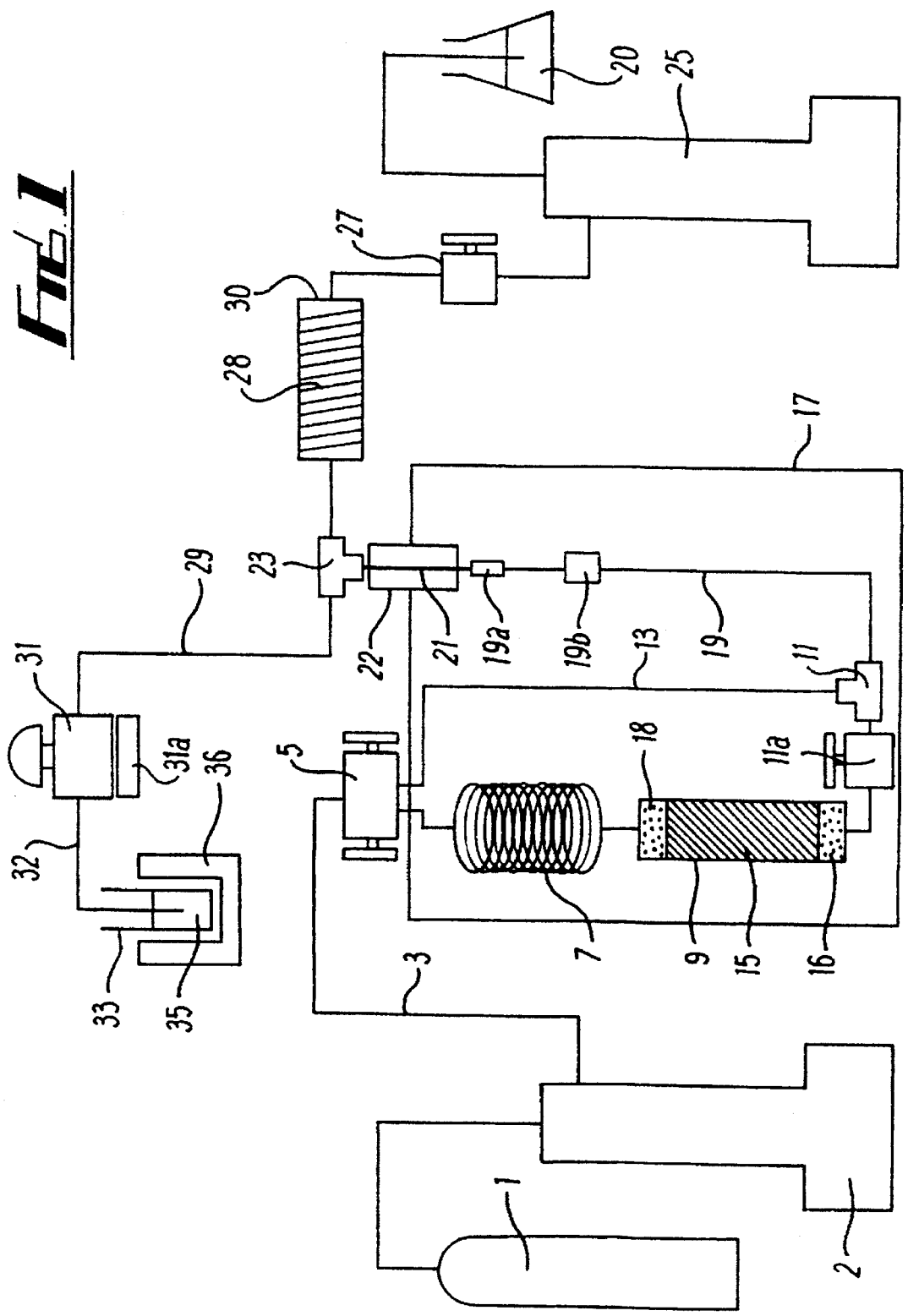
FIG. 1 is diagram partly in block schematic form of an apparatus for carrying out analysis of a sample using supercritical fluid extraction.

As shown in FIG. 1 liquid carbon dioxide (fluid 1) at ambient temperature is drawn from a source 1 into a high pressure pump 2 and is there compressed to a desired operating pressure of about 400 atmospheres. The pump delivers a continuous output flow of $CO_2$ at that pressure via a pipeline 3 to a two-way valve 5. The valve can allow $CO_2$ to pass along a coiled tube 7 and through an extraction cell 9 to an on/off valve 11a which is connected to a T-piece junction 11. Alternatively the $CO_2$ may be transferred directly via pipeline 13 to the junction 11. The extraction cell 9 comprises a solid or liquid sample 15, eg of soil particles packed between collections of glass beads 16 and 18 at the ends of the cell 9. The glass beads have an average diameter of about 100 μm. The coiled tube 7, extraction cell 9, valve 11a, pipeline 13 and the T-piece junction 11 are all contained in an oven 17 in which the temperature is maintained at a suitable temperature in the range about 20° C. to 400° C.

High pressure $CO_2$ leaving the T-piece junction 11 is delivered via a pipeline 19 also inside the oven 17 to a capillary flow restrictor 21 comprising a long-fused silica tube or stainless steel tube of narrow internal diameter, eg about 60 μm. The restrictor 21 is connected to the pipeline 19 via a union 19a. Pipeline 19 may also have an optional check valve 19b installed to ensure that fluid 2 does not "back-flush" and contaminate fluid 1 prior to mixing the two fluids at T-piece junction 23. The flow restrictor 21 is contained within an aluminium heating block 22 which is heated and thermostatically controlled to a maintained temperature in the range of 20° C. to about 400° C. depending on the sample 15. The output end of the flow restrictor 21 is connected to a T-piece junction 23.

Organic solvent fluid (fluid 2) from a source 20 is pumped by a pump 25 through an on/off valve 27 and then through coiled tubing 28 which is wrapped around a thermostatically heated aluminum block 30. The coiled tubing 28 is connected to the T-piece junction 23. A back pressure regulator 31 provides an adjustable back pressure to pressurise the solvent leaving the pump 35. The T-piece junction 23 therefore combines the $CO_2$ flow output from the flow restrictor 21 with the pressurised organic solvent output from the coiled tubing 28.

Figure 2:
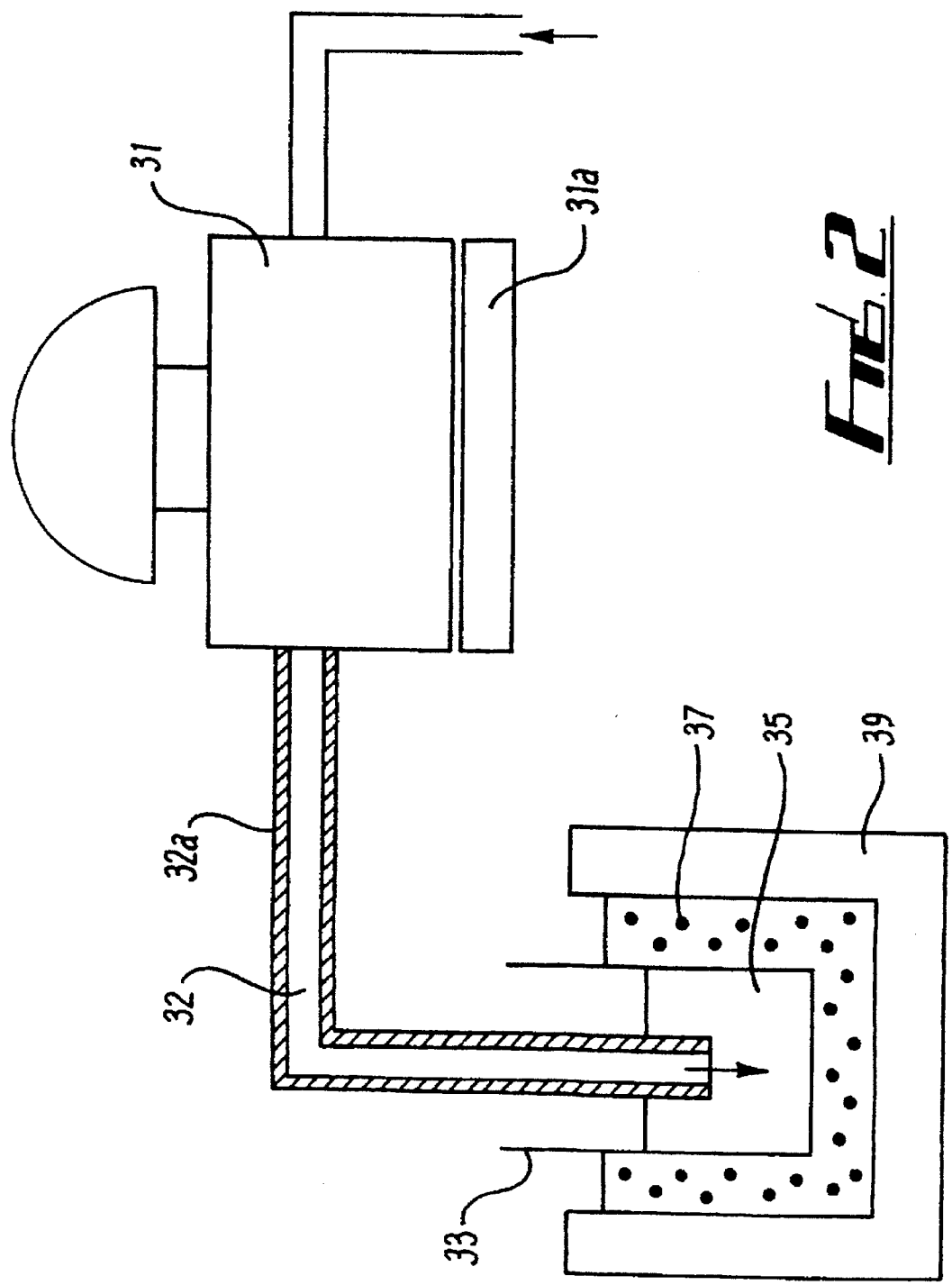
FIG. 2 is an enlarged diagram showing a specific form of part of the apparatus shown in FIG. 1.

The combined flow of $CO_2$ and organic solvent leaving the T-piece junction 23 is passed via a pipeline 39 through the back pressure regulator 31 via an outlet tube 32 to a collection vessel 33 which may contain an organic collection solvent 35. The back pressure regulator 31 may be heated with a thermostatically controlled heat source 31a. Heating the back pressure regulator 31 becomes particularly important when collecting the extract in a cooled collection vessel 33 which is either externally cooled (eg by a refrigeration unit, or an acetone/ice cold bath etc.) as shown in FIG. 2 or is cooled from the adiabatic expansion of the supercritical fluid in the collection solvent. If water is present in the extract (water being a common component in environmental samples) the water will freeze and block in the back pressure regulator outlet tube 32 which is immersed in the cooled collection vial 33 (below 0° C.). However, by heating the back pressure regulator outlet tube 32 with a water/solvent resistant thermostatically controlled heating element 32a as shown in FIG. 2 a substantially constant extraction flow rate can be obtained. The collection vessel 33 and solvent 35 are shown in FIG. 2 to be cooled by an acetone/ice mixture 37 at a temperature of −15 C. contained in a Dewar flask 39.

In use of the apparatus shown in FIG. 1, a suitable solid sample to be analysed is provided as the sample 15. The apparatus is initially pressurised to establish the desired restrictor flow rate by diverting $CO_2$ to flow via the valve 5 along the pipeline 13 with the valve 11a closed. Once the desired flow rate is achieved the extraction cell 9 loaded with sample 15 and glass beads 18 and 16 may be connected to the coiled pipe 7 and valve 11a. The valves 5 and 11a are thereafter operated to switch the flow of $CO_2$ so that the $Co_2$ is pumped through the coiled tube 7 and through the sample 15 inside the extraction cell 9 and onto the flow restrictor 21 via the pipeline 19. The tube 7 enables the temperature of the $CO_3$ to reach the temperature of the oven 17 before the $CO_2$ comes into contact with the sample 15. The $CO_2$ passes through the sample 15 and analytes are systematically extracted into the supercritical extractant $CO_2$. The collections of glass beads 16 and 18 are present to avoid entrainment of the analytes in the $CO_2$ and to prevent the material of the sample 15 compacting in the outlet of the extraction cell 9 and thereby causing plugging of the outlet. The flow of $CO_2$ containing analytes is partially depressurised in the flow restrictor 21 and combined with the pressurised flow of organic solvent by the T-piece junction 23. The combined flow of organic solvent, $CO_2$ and extracted analytes is passed via the pipeline 29 into the collection vessel 33 (which may be at ambient temperature and pressure or cooled as illustrated in FIG. 2). Carbon dioxide escapes as a gas into the atmosphere. The solubility of analytes is reduced in the collection vessel 33 because of the drop in pressure of the $CO_2$. The analytes are solvated into the organic solvent (fluid 2) and/or the collection solvent. The analytes may subsequently be removed by a suitable separation process such as evaporation or one of the other separation methods mentioned above. The amount of analyta collected may be measured in a known way, eg by spectroscopic or chromatographic methods.

The instantaneous flow rate of $CO_2$ may be measured in a known way, eg by measurement of the output from the pump 2 or by measurement of the rate of depressurised gas escaping from the collection vessel 33. The volume of $CO_2$ used in the extraction procedure may be measured as the volume of liquid $CO_2$ displaced by the pump 2 or as the volume of depressurised gas escaping from the device 33, eg using a wet-test or dry-test meter.

By adjusting the back pressure regulator 31 to increase the pressure of the organic solvent pumped by the pump 25 from the source 20, the flow rate of the analyta-containing containing supercritical $CO_2$ with which it is combined at the T-piece junction 23 is decreased. This reduction in flow rate is reversible and by decreasing the pressure of the organic solvent by adjusting the back pressure regulator 31 the flow rate of the supercritical $CO_2$ quickly increases. We have found that the response time for changes in the flow rate of $CO_2$ in the manner described, ie by adjustment of the back pressure regulator 31, is several seconds only, so that adjustments in the flow rate can be made rapidly.

The following Examples serve to illustrate the use of the apparatus shown in FIG. 1 in the analysis of samples 15 by supercritical $CO_2$ extraction.

EXAMPLE 1

Methyl alcohol, MeOH, was used as the organic solvent.

Figure 3:
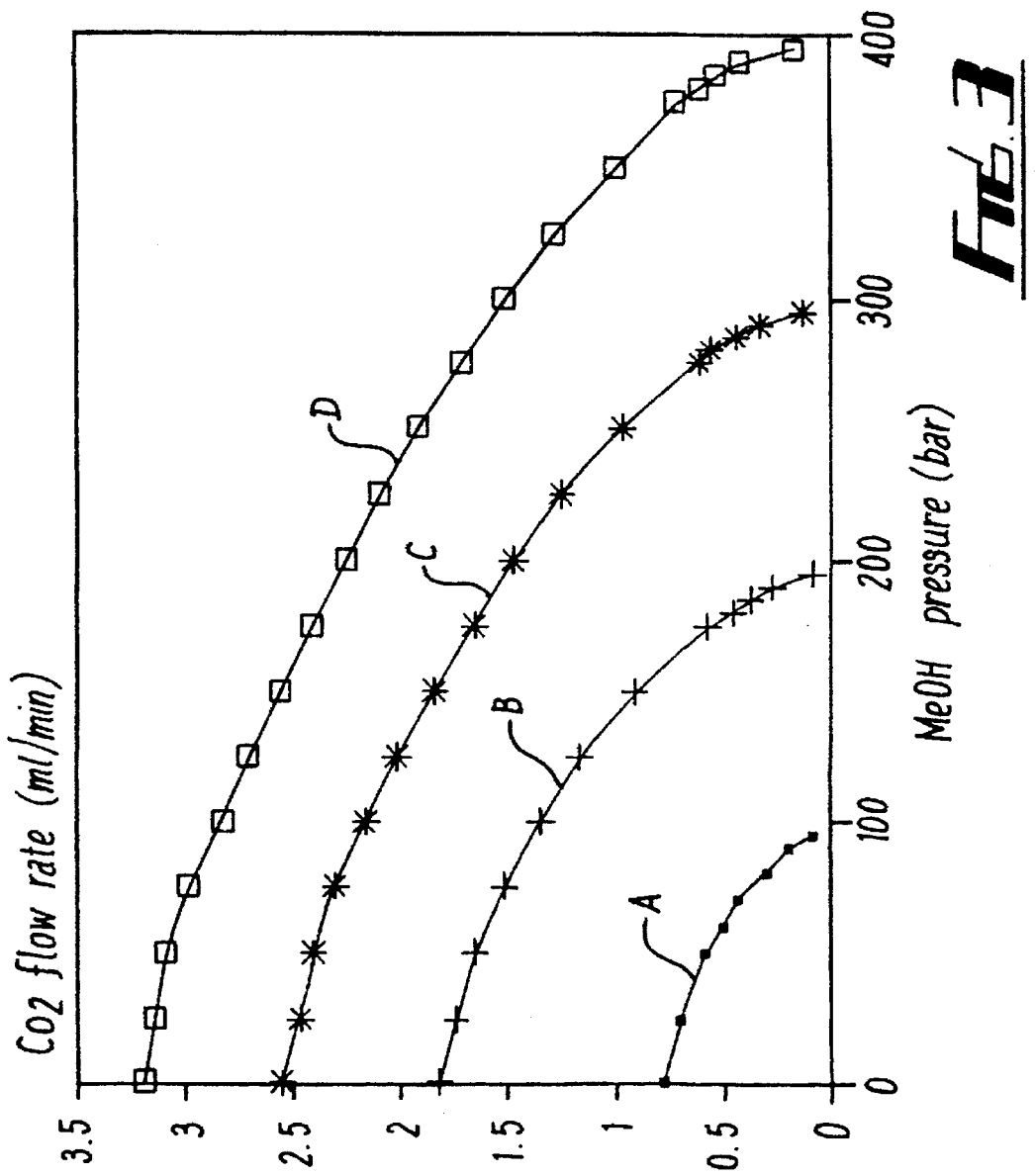
FIG. 3 is a graph of supercritical fluid flow rate versus methyl alcohol flow rate in a method of use of the apparatus shown in FIG. 1.

Using a relatively large (60 μm internal diameter) flow restrictor a wide range of organic solvent pressures and supercritical fluid flows was achieved using the high pressure pumps 2 and 25 delivering respectively the supercritical fluid in constant pressure mode and the organic solvent in constant flow mode. For example, with the supercritical $CO_2$ at a pressure of 400 bar at a temperature of 60° C. and the 60 μm restrictor 21 at a temperature of 20° C. flow rates of from 3.2 to 0.1 ml/min (liquid carbon dioxide as measured at the pump head) could be achieved by varying the pressure of the organic solvent from 1 to 395 bar respectively (see FIG. 3). Reasonable flows were also achieved at the low 100 bar supercritical $CO_2$ pressure with flow rates ranging from 0.8 to 0.08 ml/min. It was therefore possible to generate a whole range of flows at both high and low supercritical fluid pressures. Thus, both the typical solubility flow rates of 0.1 to 1.0 ml/min and the typical analytical extraction flow rates of 0.5 to 2.0 ml/min could be achieved with the same restrictor 21 so that the need to change restrictors to obtain the desired flow was eliminated. These results are illustrated in FIG. 3. The relationship between $CO_2$ flow rate (ml/min) and MeOH pressure (bars) is shown for four different $CO_2$ pump pressures, viz 100 bar, 200 bar, 300 bar and 400 bar represented in FIG. 3 respectively by the curves A, B, C and D.

EXAMPLE 2

An alternative means of controlling the flow of the supercritical $CO_2$ which can be used in conjunction with the pressurised organic solvent MeOH comprises heating the restrictor 21 so that the viscosity of the supercritical $CO_2$ increases and hence the extraction fluid flow rate decreases. For example, operating the restrictor 21 at a temperature of 20° C. and the organic solvent at 1 bar a flow rate of about 1.9 ml/min (liquid carbon dioxide as measured at the pump head) was obtained when the supercritical $CO_2$ was pressurised at 200 bar. However, on heating the restrictor 21 to 400° C. the supercritical fluid flow rate was reproducibly and reversibly reduced to 1.1 ml/min. The restrictor 21 heater temperature could therefore be used not only to reduce the adiabatic cooling at the restrictor 21 output tip and help to maintain the solubility of the analyte in the restrictor 21, but could also be used to control the extraction fluid flow rate.

These results are illustrated in Table 1 as follows.

TABLE 1

| Restrictor 21 temperature (°C.) | Supercritical $CO_2$ flow rate (ml/min) |
|---|---|
| 20 | 1.90 |
| 100 | 1.75 |
| 200 | 1.59 |
| 300 | 1.32 |
| 400 | 1.14 |

For the results shown in Table 1, the supercritical fluid ($CO_2$) was at a temperature of 60° C. and a pressure of 200 bar, and the organic solvent MeOH was at a temperature of 20° C. and a pressure of 1 bar. The flow rate was measured as the rate of liquid carbon dioxide delivered from the pump 2.

EXAMPLE 3

One of the most difficult experiments to undertake with a supercritical fluid is a solubility investigation as the supercritical fluid is saturated with the analyte of interest. In the prior art, when the system is depressurised to collect the analyte severe restrictor plugging can be encountered. A solubility study is therefore an ideal way of rigorously demonstrating the ability of examples of the invention to eliminate restrictor plugging. A representative analyte, namely ferrocene was chosen as ferrocene has a high solubility in supercritical carbon dioxide (ca 2 wt % ferrocene) and is highly coloured (bright orange) so that a visual inspection of the tubing and valves would enable the location of the plug to be determined if plugging were to occur.

To ensure that the supercritical fluid became saturated with the target analyte a relatively large, 10 g, sample size was used, and silanized glass beads (100 µm O.D.) were mixed with the sample 15 to increase the contact between the supercritical fluid and analyte.

Table 2 as follows shows the solubility of ferrocene in supercritical carbon dioxide at various $CO_2$ pressures and temperatures.

TABLE 2

| | $CO_2$ Temperature 40° C. | $CO_2$ Temperature 50° C. |
|---|---|---|
| $CO_2$ pressure 134 bar | | |
| Flowrate (ml/min) | 0.24 (2.4) | 0.23 (1.0) |
| Solubility (mole fraction) | $1.49 \times 10^{-3}$ (5.4) | $1.37 \times 10^{-3}$ (2.1) |
| $CO_2$ pressure 245 bar | | |
| Flowrate (ml/min) | 0.19 (2.0) | 0.22 (2.8) |
| Solubility (mole fraction) | $2.46 \times 10^{-3}$ (4.3) | $3.17 \times 10^{-3}$ (3.8) |

TABLE 2-continued

| | $CO_2$ Temperature 40° C. | $CO_2$ Temperature 50° C. |
|---|---|---|
| $CO_2$ pressure 335 bar | | |
| Flowrate (ml/min) | 0.27 (7.4) | 0.20 (6.2) |
| Solubility (mole fraction) | $3.09 \times 10^{-3}$ (9.1) | $3.54 \times 10^{-3}$ (8.2) |

| | $CO_2$ Temperature 60° C. | $CO_2$ Temperature 70° C. |
|---|---|---|
| $CO_2$ pressure 134 bar | | |
| Flowrate (ml/min) | 0.21 (1.8) | 0.21 (0.3) |
| Solubility (mole fraction) | $1.08 \times 10^{-3}$ (5.7) | $7.72 \times 10^{-4}$ (0.4) |
| $CO_2$ pressure 245 bar | | |
| Flowrate (ml/min) | 0.20 (4.4) | 0.22 (5.9) |
| Solubility (mole fraction) | $3.92 \times 10^{-3}$ (6.2) | $4.81 \times 10^{-3}$ (3.0) |
| $CO_2$ pressure 335 bar | | |
| Flowrate (ml/min) | 0.19 (7.8) | 0.22 (7.4) |
| Solubility (mole fraction) | $4.83 \times 10^{-3}$ (5.2) | $5.98 \times 10^{-3}$ (4.9) |

Each value of flow rate and solubility in parenthesis shown in Table 2 is the relative standard deviation obtained using triplicate extractions.

Even though the carbon dioxide contained up to about 2 wt % ferrocene a reproducible flow rate was attainable with a relative standard deviation of less than 10%. Owing to the highly soluble nature of the ferrocene the restrictor 21 was heated to a temperature of 200° C. and the organic solvent was heated to 70° C. to ensure that a continuous extraction flow rate was achieved. The substantially constant flow rate obtained during this solubility study with relative standard deviations of less than 8% demonstrates that no plugging occurred even when the conditions were changed and the solubility of ferrocene in carbon dioxide increased.

EXAMPLE 4

A dark green nickel complex $Ni[C_{22}H_{22}N_4]$ was also investigated as the analyte for solubility study. This complex was three orders of magnitude less soluble than the ferrocene complex used in Example 3. The nickel complex like the ferrocene complex severely plugged the linear restrictor when collected by using the conventional off-line collection techniques. However, using the apparatus shown in FIG. 1 a continuous extraction flow rate was achievable with the nickel complex (Table 3) by means of heating the restrictor 21 and using a pressurised organic solvent. Owing to the lower solubility of the nickel complex in the supercritical fluid, restrictor 21 needed to be heated only to 125° C. and the pressurised organic solvent at 60° C. to maintain the extraction flow rate.

Table 3 as follows shows the solubility of the nickel complex obtained for various $CO_2$ pressures.

TABLE 3

Solubility of Ni [C$_2$H$_2$N$_4$] complex

| | 60° C. CO$_2$ | 60° C. CO$_2$/10% MeOH |
|---|---|---|
| CO$_2$ pressure 161 bar | | |
| Flowrate (ml/min) | 0.21 (8.1) | 0.22 (3.1) |
| Solubility (mole fraction) | 3.4 × 10$^{-8}$ (1.8) | 6.72 × 10$^{-7}$ (2.0) |
| CO$_2$ pressure 252 bar | | |
| Flowrate (ml/min) | 0.21 (6.2) | 0.20 (2.1) |
| Solubility (mole fraction) | 6.2 × 10$^{-7}$ (7.2) | 2.26 × 10$^{-6}$ (6.7) |
| CO$_2$ pressure 342 bar | | |
| Flowrate (ml/min) | 0.21 (2.1) | 0.21 (2.6) |
| Solubility (mole fraction) | 1.4 × 10$^{-6}$ (5.3) | 3.05 × 10$^{-6}$ (4.3) |

Each value of flow rate and of solubility in Table 3 is the relative standard deviation obtained using triplicate extractions.

As shown in Table 3, by using the nickel complex very reproducible extraction flow rates and solubility values were obtained with low relative standard deviations (RSD) of less than 8%. The low RSD values for the solubility measurements included all the variables associated with the extraction, collection and quantitative analysis of the analyte, thus demonstrating in this Example the robustness and reproducibility of the method embodying the invention. As the nickel complex has a very low solubility in pure supercritical CO$_2$ a modifier (10 wt % methanol) was added to the supercritical fluid to enhance the solubility of the analyte. As fused silica restrictors become brittle and break when used with the organically modified supercritical CO$_2$, 60 μm I.D. stainless steel restrictor 21 was used with the CO$_2$/10% methanol extraction fluid. The flow rate and solubility values obtained with the modified extraction fluid were as reproducible as those obtained with pure CO$_2$, namely with RSD values in the region of about 7%. The apparatus shown in FIG. 1 is therefore equally suited to modified supercritical fluids as it is with pure fluids, and the same range of low rates is achievable with the modified fluid.

EXAMPLE 5

The collection efficiency of the apparatus shown in FIG. 1 was investigated using n-alkanes spiked onto sorbent resin, Tenax TA (Trade Mark) and extracted with supercritical CO$_2$. The results (Table 4) obtained show that use of the apparatus shown in FIG. 1 and the method embodying the invention allows a broad range of analytes to be retained much more efficiently than using the conventional off-line collection method of heating the linear flow restrictor with a heat gun as the CO$_2$ depressurises into the organic collection solvent in the collection device at atmospheric conditions. Using a pressurised organic solvent (fluid 2) to collect the analytes ensures efficient collection and reduces the problem of solvent and analyte evaporation during the extraction as organic solvent is continually being added to the collection device 33.

Solvent evaporation can be reduced even further if the collection vessel 33 is externally cooled with a cooling device (eg a refrigeration unit, or an acetone/ice cold bath etc.) so that the solvent required to maintain the collection solvent volume can be reduced while the collection efficiency of the system is increased.

Using a cooled collection vessel 33 as shown in FIG. 2 in conjunction with the apparatus shown in FIG. 1, the amount of solvent required to maintain the collection solvent volume during a 30 minute extraction could be reduced by ⅔ when compared to the solvent requirements of the conventional extraction system (eg a linear flow restrictor periodically heated with a heat gun). See Table 4 below. To ensure that extracted water did not freeze in the outlet tube of the back pressure regulator (the outlet tube being indirectly cooled as it is partially situated in the cooled collection solvent, FIG. 2), the outlet was thermostatically heated to a temperature of 20° C. with a water/solvent resistant heating element. Using the heated back pressure regulator with a cooled collection solvent (FIG. 2) enabled the apparatus shown in FIG. 1 to maintain a continuous extraction flow rate whilst still maintaining very high collection efficiencies and very low collection solvent evaporation rates that far exceed those obtained with a conventional extraction system (Table 4).

The results obtained in Example 5 are illustrated in Table 4 as follows in which "BPR" indicates use and temperature of a heated restrictor 21 together with use of a pressurised solvent added to the supercritical CO$_2$. (BPR=back pressure regulator).

TABLE 4

Collection efficiency (%)

| Analyte (n-alkane) | Conventional method (See note a) | BPR not heated Collection vial not cooled (See note b) | BPR heated (20° C.) Collection vial cooled to −10° C. (See note c) |
|---|---|---|---|
| C$_6$ | 17 (6) | 20 (17) | 36 (22) |
| C$_7$ | 51 (8) | 65 (15) | 75 (8) |
| C$_8$ | 75 (3) | 87 (8) | 90 (2) |
| C$_9$ | 90 (2) | 95 (4) | 95 (1) |
| C$_{10}$ | 100 (2) | 97 (2) | 99 (2) |
| C$_{11}$ | 101 (3) | 96 (1) | 100 (1) |
| C$_{12}$ | 100 (2) | 97 (1) | 102 (2) |
| C$_{15}$ | 101 (4) | 99 (1) | 101 (2) |
| Solvent addition (See note d) | 0.5 ml/min | 0.45 ml/min | 0.35 ml/min | note a: The conventional collection method involves heating the linear flow restrictor with a heat gun as CO$_2$ depressurises into an organic collection solvent at atmospheric conditions. The analytes were extracted from Tenax TA with 60° C., 400 bar CO$_2$ for 30 minutes.

note b: The restrictor 21 is heated with a thermostatically controlled heating block set at 100° C. and the analytes are collected in a pressurised (350 bar) collection solvent. No temperature control of the back pressure regulator outlet tube or collection vial was undertaken. The analytes were extracted from Tenax TA with 60° C., 400 bar CO$_2$ for 30 minutes.

note c: The restrictor 21 is heated with a thermostatically controlled heating block set at 100° C. and the analytes are collected in a pressurised (350 bar) collection solvent. The back pressure regulator outlet tube was heated to 20° C. with a thermostatically controlled water/solvent resistant heater and the collection vial was cooled to −10° C. with an acetone/ice cold bath. The analytes were extracted from Tenax TA with 60° C., 400 bar CO$_2$ for 30 minutes.

note d: The rate of liquid solvent addition required to maintain the collection solvent volume during a 30 minute extraction.

EXAMPLE 6

The apparatus shown in FIG. 1 with the adapted back pressure regulator arrangement shown in FIG. 2 was used to extract real world samples and a continuous extraction flow was obtained for both a highly contaminated environmental sample (a crude petroleum pitch) and a natural product (lavender plant material). The results obtained are given graphically in FIG. 4. Conversely, when these real world samples were extracted using a conventional extraction system with a linear flow restrictor periodically heated with a heat gun, the restrictor either slowly became plugged (lavender sample) or completely plugged (petroleum sample). See FIG. 4.

In FIG. 4 the curves labelled A, B, C, D represent the following experiments:

A. Petroleum crude extracted with a conventional extraction system.
B. Lavender plant material extracted with a conventional extraction system.
C. Petroleum crude extracted with a heated back pressure regulator outlet tube (20° C.) and cooled collection vial (−10° C.).
D. Lavender plant material extracted with a heated back pressure regulator outlet tube (20° C.) and cooled collection vial (−10° C.).

EXAMPLE 7

Apparatus as shown in FIG. 1 can also be used to measure diffusion coefficients in supercritical fluids. Instead of being injected into an extraction cell the solute is injected into an empty flow-tube and as a pulse of solutes travels along the flow-tube it is broadened by the effects of axial and radial dispersion. From the width of the measured outlet curve it is possible to calculate the diffusion coefficient of the solute in a supercritical fluid. However, if reliable data is to be obtained very low flow rates of the solute rich supercritical fluid are required. Conventional apparatus gives erratic flows with such analyte rich fluids but the present invention overcomes these flow problems and is able to generate very reproducible, steady, low, supercritical fluid flow rates.

EXAMPLE 8

The use of stainless steel in the construction of a high temperature, high pressure systems is limited when the extraction process involves the presence of complexing agents which can attack the steel and cause corrosion problems. Materials alternative to stainless steel which can be used at similar high temperatures and pressures but are corrosion resistant to these reagents under supercritical fluid extraction conditions are preferred. An example of the use of the present invention with such materials was carried out as follows.

1 g of 100 μm OD metal particles (the metals being selected from those listed in Table 5 below), 10 mg of complexing agent and 10 μl of distilled water were placed inside a 1 ml extraction cell. The cell was pressurised with 400 atm, 60° C. $CO_2$ and left to equilibrate statically for 30 minutes. After the equilibration step the cell contents were dynamically extracted for 10 minutes with 400 atm, 60° C. $CO_2$ at 1 ml/min. The extract was collected in methanol using the apparatus shown in FIG. 1 and analysed by inductively coupled plasma (ICP) emission spectroscopy.

The results obtained are given in Table 5 as follows.

TABLE 5

| Complexing agent | μg/metal extracted | | | |
|---|---|---|---|---|
| | Stainless steel (Fe) | Tantalum | Titanium | Zirconium |
| Thenoyltrifluoroactone | 145.2 | <0.002 | 0.3 | 0.7 |
| Diethylammonium-diethyldithiocarbamate | 7.3 | <0.002 | 0.06 | 0.02 |
| 5-fluoro-8-hydroxy-quinoline | 3.6 | <0.002 | 0.06 | 0.7 |

Using the alternative materials Ta, Ti and Zr, the corrosion can be reduced by several orders of magnitude, to within a level that enables the apparatus to be operated on a routine basis with these corrosive reagents in supercritical fluids. These alternative materials, particularly, titanium and tantalum can easily be machined into tubing, valves and unions, and a working titanium system has been successfully operated under supercritical fluid extraction conditions with corrosive complexing agents and no major corrosion problems were encountered.

We claim:

1. A method of separating a solute from a supercritical fluid, said method including the steps of:
    passing supercritical fluid and solute through a flow restrictor causing a partial reduction in pressure in the supercritical fluid and solute;
    mixing the supercritical fluid and solute with another fluid under pressure to maintain solubility of said solute in a resultant pressurized mixture; and passing said mixture to a collection devive wherein the solute and said other fluid are collected, and thereby reducing the pressure of the fluid mixture.

2. A method as in claim 1 and wherein the fluid mixture pressure reduction occurs in a collection device, the supercritical fluid being vented from the collection device as a gas.

3. A method as in claim 2 and wherein a collection solvent is present in the collection device.

4. A method as in claim 2 and wherein said other fluid acts as a collection solvent in the collection device.

5. A method as in claim 4 and wherein the solute is subsequently separated from the collection solvent by a separation process.

6. A method as in claim 1 and wherein the pressure of said other fluid is varied and controlled by a back pressure regulator.

7. A method as in claim 6 and wherein the back pressure regulator is located in the flow of mixed fluids comprising the supercritical fluid and the said other fluid.

8. An apparatus for separating a solute from a supercritical fluid, said apparatus comprising:
    a flow restrictor through which said supercritical fluid and solute are passed causing a partial reduction in pressure in the supercritical fluid and solute;
    mixing means for mixing the supercritical fluid and solute, after passage through said flow restrictor, with another fluid under pressure to maintain solubility of said solute in a resultant pressurized mixture, said supercritical fluid and said another fluid comprising a collection solvent; and means for delivering the mixture of said collection solvent to a collection device for collection of said solute.

9. An apparatus as in claim 8 and wherein the apparatus includes a back pressure regulator to vary and control the pressure of said collection solvent.

10. An apparatus as in claim 9 and wherein the back pressure regulator is located in the means for delivering said collection solvent.

11. An apparatus as in claim 9 and which includes means for heating the back pressure regulator.

12. An apparatus as in claim 8 and wherein the collection device is contained in a jacket in which a coolant is present.

13. An apparatus as in claim 8 and wherein the apparatus includes a delivery tube for delivering fluid into the collection device, the delivery tube having means for heating the tube.

14. An apparatus as in claim 8 including means for maintaining the collection solvent volume during said method by adding an appropriate volume of fluid to the collection device.

* * * * *